(12) United States Patent
Antonini et al.

(10) Patent No.: US 11,126,947 B2
(45) Date of Patent: Sep. 21, 2021

(54) DEVICES, METHODS, AND SYSTEMS FOR AIRSIDE PERFORMANCE ANALYSIS

(71) Applicant: Honeywell International Inc., Morris Plains, NJ (US)

(72) Inventors: Andrea Antonini, Dubai (AE); Rajesh V. Poojary, Bangalore (IN); Maksood Moidin Kadike, Dubai (AE); Saroj Sendha, Bangalore (IN)

(73) Assignee: Honeywell International Inc., Charlotte, NC (US)

( * ) Notice: Subject to any disclaimer, the term of this patent is extended or adjusted under 35 U.S.C. 154(b) by 830 days.

(21) Appl. No.: 15/637,349

(22) Filed: Jun. 29, 2017

(65) Prior Publication Data
US 2018/0005159 A1    Jan. 4, 2018

Related U.S. Application Data

(60) Provisional application No. 62/357,095, filed on Jun. 30, 2016.

(51) Int. Cl.
*G06Q 10/06* (2012.01)

(52) U.S. Cl.
CPC .............................. *G06Q 10/06393* (2013.01)

(58) Field of Classification Search
None
See application file for complete search history.

(56) References Cited

U.S. PATENT DOCUMENTS

| 6,760,663 | B2 * | 7/2004 | Brenner | G01S 5/009 342/357.48 |
| 8,060,400 | B2 * | 11/2011 | Wellman | B66F 9/24 235/375 |
| 2002/0035495 | A1 * | 3/2002 | Spira | G06Q 10/04 705/7.36 |
| 2008/0010107 | A1 * | 1/2008 | Small | G06Q 10/06 705/1.1 |
| 2010/0036596 | A1 * | 2/2010 | Dunsky | G06Q 10/06 701/120 |

(Continued)

FOREIGN PATENT DOCUMENTS

EP    2597602 A1    5/2013

OTHER PUBLICATIONS

Methods and System for Dynamic content management based on Business Intelligence gathered through Combined Rating, Metric and Demographic Data Obtained through Shareable, Instrumented Widgets. The IP.com Journal, The IP.com Prior Art Database, Apr. 27, 2010. (Year: 2010).*

(Continued)

*Primary Examiner* — Stephanie Z Delich
(74) *Attorney, Agent, or Firm* — Brooks, Cameron & Huebsch, PLLC

(57) ABSTRACT

Devices, methods, and systems for airside performance analysis are described herein. One system includes a computing device to: receive key performance indicator (KPI) data from a number of different system monitors, correlate the KPI data to generate a number of graphical representations of the correlated KPI data, link the number of widgets to update the corresponding report based on a received selection, and display a number of widgets that generate a corresponding report of the correlated KPI data.

20 Claims, 6 Drawing Sheets

(56) References Cited

U.S. PATENT DOCUMENTS

| | | | | |
|---|---|---|---|---|
| 2012/0245836 A1* | 9/2012 | White | ............... | G08G 5/065 |
| | | | | 701/120 |
| 2015/0169709 A1* | 6/2015 | Kara | ............... | G06Q 10/0639 |
| | | | | 707/736 |
| 2016/0070689 A1* | 3/2016 | Siklos | ............ | G06Q 10/06393 |
| | | | | 707/740 |
| 2016/0107033 A1* | 4/2016 | Ellis | ............... | A61B 5/0022 |
| | | | | 434/247 |
| 2016/0371623 A1* | 12/2016 | Sharma | ............ | G06Q 10/06393 |
| 2017/0236075 A1* | 8/2017 | Shi | ..................... | G06T 7/001 |
| | | | | 701/31.4 |

OTHER PUBLICATIONS

Extended Search and Written Opinion from related European Patent Application No. 17178836, dated Sep. 25, 2017, 8 pages.
Communication Pursuant to Article 94(3) EPC from related European Patent Application No. 17178836, dated Mar. 28, 2018, 6 pages.
Summons to Attend Oral Proceedings from related European Application No. 17178836, dated May 14, 2019, 8 pages.

* cited by examiner

DEVICES, METHODS, AND SYSTEMS FOR AIRSIDE PERFORMANCE ANALYSIS

PRIORITY INFORMATION

This application is a Non-Provisional of U.S. Provisional Application No. 62/357,095, filed Jun. 30, 2016, the contents of which are incorporated herein by reference.

TECHNICAL FIELD

The present disclosure relates to devices, methods, and systems for airside performance analysis.

BACKGROUND

Data analysis and visualization of the data analysis can be utilized to identify potential problems with airport operations. Airports can utilize data analysis to identify performance problems and/or to identify performance improvements. The data analysis of an airport can be utilized to generate reports that can be utilized by performance managers to improve airport performance.

DETAILED DESCRIPTION

Figure 1:
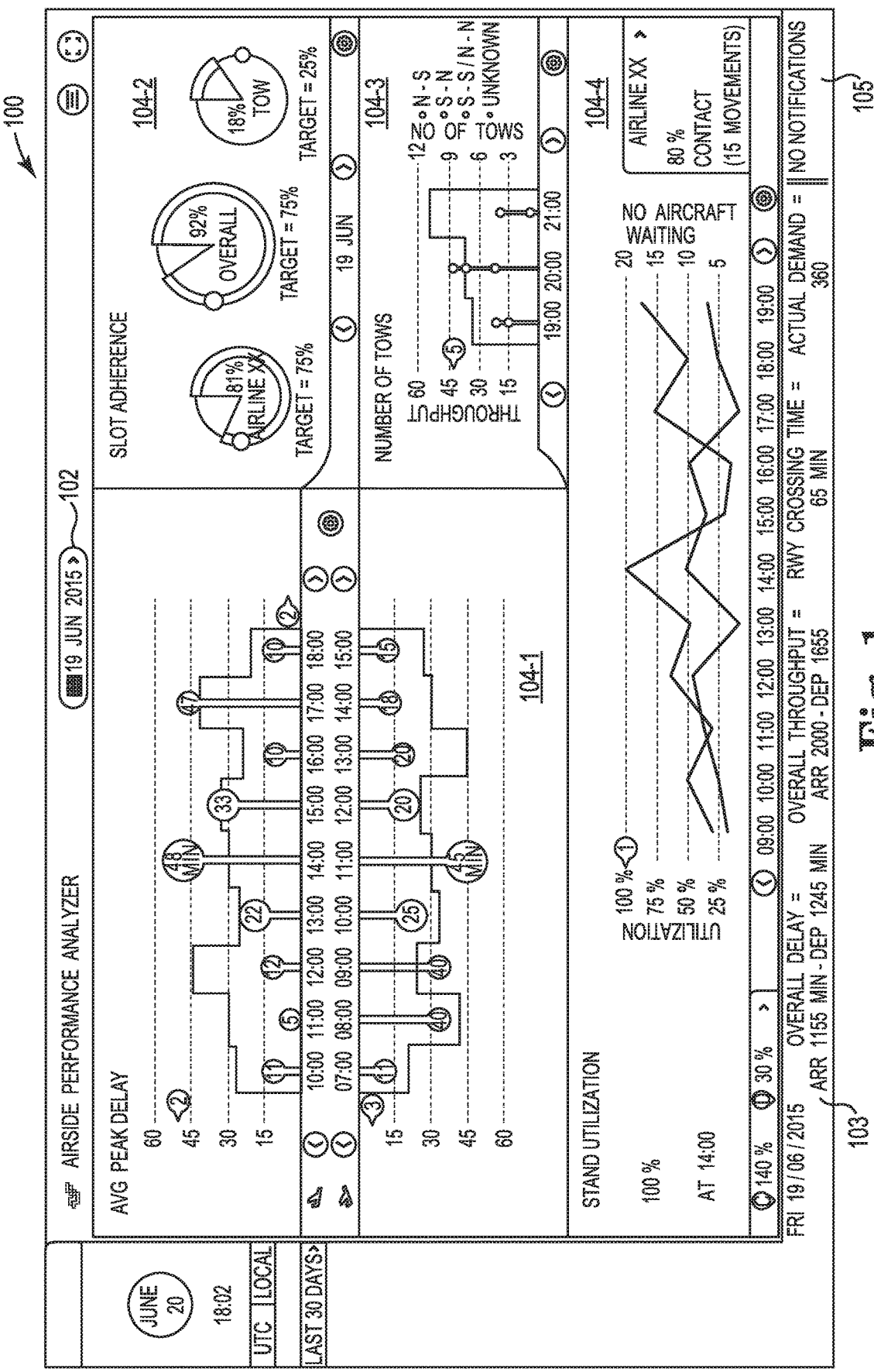
FIG. 1 is an example of a system for airside performance analysis according to one or more embodiments of the present disclosure.

Devices, methods, and systems for airside performance analysis are described herein. One system includes a computing device to: receive key performance indicator (KPI) data (e.g., real time KPI data, post event key performance indicator, etc.) from a number of different system monitors, correlate the KPI data to generate a number of graphical representations of the correlated KPI data, link the number of widgets to update the corresponding report based on a received selection, and display a number of widgets that generate a corresponding report of the correlated KPI data.

The devices, methods, and systems described herein can utilize the KPI data to generate reports and graphical representations of site performance. For example, the airside performance analysis can utilize KPI data from a plurality of different systems monitoring airport performance. In this example, the KPI data can be correlated and organized by a number of widgets that can generate performance data into a number of reports. In some examples, the number of widgets can utilize real time KPI data to generate performance reports based on a corresponding calculation performed by each of the number of widgets.

In some examples, the number of widgets can be selected based on a user preference and pinned to a user interface to monitor selected performance of the airport. In some examples, each KPI data metric can include a corresponding widget that can be pinned or deleted from the user interface. In some examples, a widget can be selected to display a relationship of KPI data utilized for the widget.

In some examples, the selected widgets are pinned to a user interface of the computing device and displayed for a user associated with a particular user profile. For example, the selected widgets from a plurality of widgets can be pinned to the user interface and saved to the user interface within a user profile associated with a particular user. In this example, the number of widgets pinned to the user interface can remain on the user interface when the particular user logs into the system. In some examples, the widget can be deleted from the user interface and the deleted widget may not appear when a user logs back into the system. In some examples, the number of widgets can be linked by a time period. For example, a time period can be selected and the number of widgets can each be updated to reflect KPI data corresponding to the time period.

In some examples, the devices, methods, and systems described herein can be utilized to identify causes and/or consequences of the KPI data. The causes and/or consequences of the KPI data can be utilized to provide a user with a better performance overview compared to previous systems and methods. In some examples, a user interface can be utilized to pin particular widgets based on a user profile of a user utilizing the systems described herein.

In some examples, the devices, methods, and systems described herein can be utilized to show performance data and KPI data on a plurality of different levels. In some examples, each of the plurality of different levels can provide a different level of detail for corresponding data. For example, each of the number of widgets can be selected to display a particular level from the plurality of levels. In some examples, a user may want to utilize a relatively low level of detail to identify a problem with a corresponding system. In some examples, a user may want to utilize a relatively high level of detail to identify data that may result in errors displayed on a relatively lower level of detail. For example, a relatively high level of detail can display support documentation of the KPI data utilized by a particular widget upon a selection of the particular widget.

In the following detailed description, reference is made to the accompanying drawings that form a part hereof. The drawings show by way of illustration how one or more embodiments of the disclosure may be practiced.

These embodiments are described in sufficient detail to enable those of ordinary skill in the art to practice one or more embodiments of this disclosure. It is to be understood that other embodiments may be utilized and that process changes may be made without departing from the scope of the present disclosure.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure, and should not be taken in a limiting sense.

The figures herein follow a numbering convention in which the first digit or digits correspond to the drawing figure number and the remaining digits identify an element or component in the drawing. Similar elements or components between different figures may be identified by the use of similar digits.

FIG. 1 is an example of a system 100 for airside performance analysis according to one or more embodiments of the present disclosure. In some examples, the system 100 can be for real time airside performance analysis and post event analysis of an airside operational performance. In some examples, the system 100 can be a display of a user interface coupled to a computing device as described herein (e.g., computing device 690 as referenced in FIG. 6, etc.). In some examples, the system 100 can include a number of widgets 104-1, 104-2, 104-3, 104-4 that can utilize KPI data to generate performance metrics for a plurality of systems. Examples of airport data are utilized herein to describe the embodiments, however other types of data can be utilized in a similar way.

In some examples, the number of widgets 104-1, 104-2, 104-3, 104-4 can utilize KPI data for a particular time period (e.g., In some examples, the time period can be selected utilizing a date tool 102. In some examples, the number of widgets 104-1, 104-2, 104-3, 104-4 can each be utilized to generate a particular type of performance data based on particular KPI data.

In some examples, each of the number of widgets 104-1, 104-2, 104-3, 104-4 can correlate particular KPI data to generate corresponding performance data. For example, an average peak delay widget can utilize and/or correlate arrival delay data, arrival throughput data, departure delay data, and departure throughput. In another example, a slot adherence widget can utilize and/or correlate overall slot adherence data to specific airline slot adherence data. In another example, a tow widget can utilize and/or correlate tow throughput and tow directions for a terminal and/or a specific runway of a terminal. In some examples, the tow widget can be utilized to generate a tow report with loss movements KPI data. In another example, a stand utilization widget can utilize and/or correlate overall stand utilization data, a quantity of aircraft waiting on ground KPI data, concourses stand utilization data, pier service level split data between a first airline, a second airline, a terminal and a number of flights at the terminal.

The KPI correlations can be utilized to generate the performance data as described herein. For example, widget 104-1 can be an average peak delay widget that can utilize KPI data to generate performance data relating to departure delay (e.g., take off delay, etc.) and/or arrival delay (e.g., landing delay, etc.) relating to a particular airport. In another example, widget 104-2 can be a slot adherence widget. As used herein, the slot adherence widget can be utilized to monitor a utilization of landing slots, takeoff slots, or other airport slots. In another example, the widget 104-3 can be a number of tow widgets that can utilize KPI data to display a quantity of tows for a particular time period. Furthermore, widget 104-4 can be a stand utilization widget that can utilize KPI data to display a utilization of a number of airport stands over a period of time.

In some examples, the number of widgets 104-1, 104-2, 104-3, 104-4 can be selected from a plurality of additional widgets (not shown). In some examples, the number of widgets 104-1, 104-2, 104-3, 104-4 can be displayed based on a user profile. For example, the number of widgets 104-1, 104-2, 104-3, 104-4 that are displayed by the system 100 can correspond to features of the airport that pertain to a particular user. In some examples, the number of widgets 104-1, 104-2, 104-3, 104-4 that are displayed by the system 100 can correspond to KPI data and a job description associated with a user profile. For example, the number of widgets 104-1, 104-2, 104-3, 104-4 can display KPI data and/or correlated KPI data for a particular time period or at a particular level based on the job description associated with the user profile.

Figure 6:
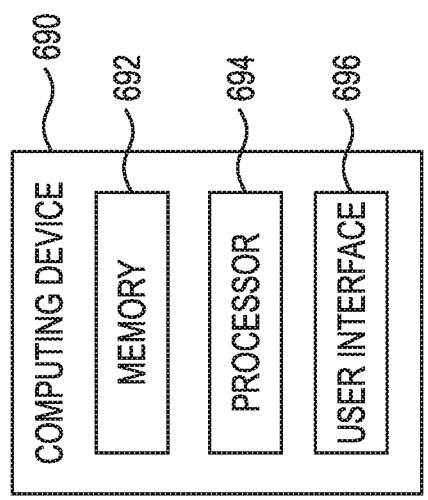
FIG. 6 is an example of a computing device for airside performance analysis according to one or more embodiments of the present disclosure.

In some examples, the number of widgets 104-1, 104-2, 104-3, 104-4 can be utilized to receive a number of selections via a user interface as described herein (e.g., user interface 696 as referenced in FIG. 6, etc.). In some examples, the number of selections can alter a number of features or generated performance data of the number of widgets 104-1, 104-2, 104-3, 104-4. For example, the number of selections can change a level of detail and/or a time period for the KPI data. In some examples, the number of selections can include selecting or deselecting particular KPI data to be correlated for a particular widget of the number of widgets 104-1, 104-2, 104-3, 104-4.

In some examples, the received selection is a cursor over selection. As used herein, a cursor over selection includes placing a cursor (e.g., mouse cursor, etc.) over an area without initiating an additional selection (e.g., pressing a mouse button, etc.). That is, a cursor over selection can include moving a cursor over an area to initiate a first selection without selecting the area using a selection device (e.g., mouse button, etc.), which can be utilized to initiate a second selection. In some examples, a cursor over selection can be utilized with the date tool 102 to show a preview of each of the number of widgets 104-1, 104-2, 104-3, 104-4 when a cursor over selection is made on a particular date. For example, a cursor over selection can provide a preview of correlated KPI data for a particular time period when the cursor is positioned over the particular time period.

In some examples, the system 100 can include a notification tool 105. In some examples, the notification tool 105 can be utilized to receive and/or display alerts and other types of notifications relating to the airport or systems utilized to monitor the airport operations. In some examples, the notification tool 105 can utilize a scrolling text to display real time KPI data. In some examples, the scrolling text can be updated in real time to allow a user to monitor the real time KPI data. In some examples, the notification tool 105 can display real time KPI data based on the user profile. That is, the notification tool 105 can display KPI data and/or other notifications based on what is relevant to a particular user of the system 100.

In some examples, the system 100 can include an information bar tool 103. In some examples, the information bar tool 103 can be utilized to display KPI data, real time KPI data, scrolling text, and/or other notifications similar to the notification tool 105. In some examples, the information bar tool 103 can display information based on the user profile of the user utilizing the system 100.

Figure 2:
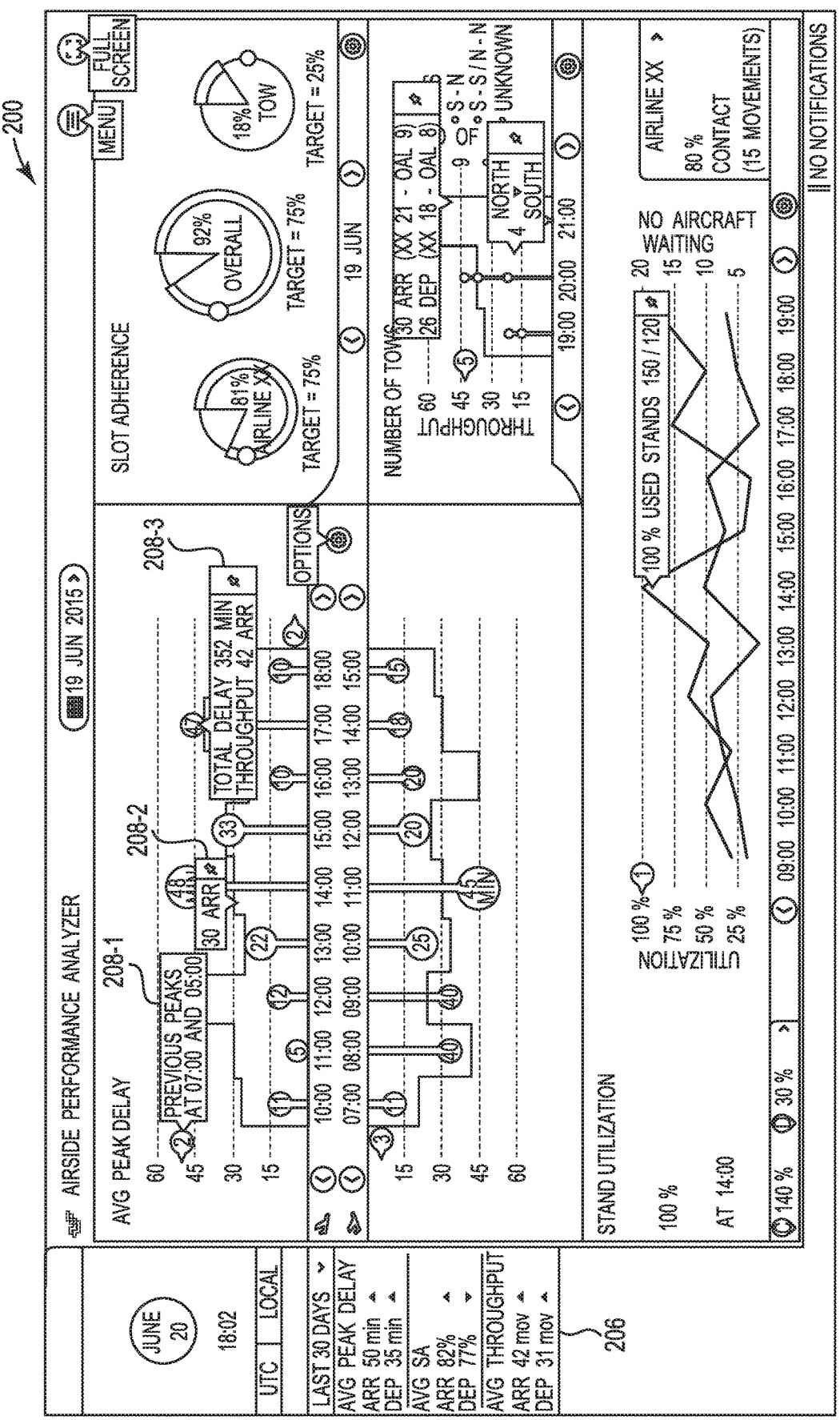
FIG. 2 is an example of a system for airside performance analysis according to one or more embodiments of the present disclosure.

FIG. 2 is an example of a system 200 for airside performance analysis according to one or more embodiments of the present disclosure. In some examples, the system 200 can include the same or similar features as system 100 as referenced in FIG. 1. For example, the system 200 can include a number of widgets as described herein.

In some examples, the system 200 can include a number of cursor over selections 208-1, 208-2, 208-3. As described herein, a cursor over selection 208-1, 208-2, 208-3 includes placing a cursor (e.g., mouse cursor, etc.) over an area without initiating an additional selection (e.g., pressing a mouse button, etc.). For example, a user can provide a cursor over selection 208-1 to display a previous peak within an average peak delay widget. In another example, a user can provide a cursor over selection 208-2 to display a current area or airport that corresponds to the data within the average peak delay widget. In another example, the user can provide a cursor over selection 208-3 to display a total delay or throughput at a particular time.

In some examples, the system 200 can include an overview menu tool 206. The overview menu tool 206 can be utilized to display KPI data from a different time period compared to the time period utilized by the number of widgets. For example, the overview menu tool 206 can display the generated performance data from one or more of the widgets for a different time period. In some examples, the different time period can include a relatively longer time period compared to the widgets. For example, the number of widgets can utilize a time period of 24 hours and the overview menu tool 206 can utilize a time period of 30 days.

In some examples, the overview menu tool 206 can provide data corresponding to a particular time period. For example, when a time period of a single day is selected, the corresponding data can be broken into hours of the single day. For example, the KPI data can be correlated for each hour of the day. In another example, when a time period of a month is selected, the corresponding data can be broken into individual days and not individual hours. In another example, when a time period of a year is selected, the corresponding data can be broken into individual months and not individual days or individual hours. Furthermore, when a time period of a season is selected, the corresponding data can be broken into individual seasons (e.g., summer, winter, fall, spring, etc.).

In some examples, the system 200 can include a query tool. In some examples, the query tool can be utilized to search for KPI data. In some examples, the query tool can be utilized to search for specific KPI data that corresponds to a particular airline and/or specific KPI data that corresponds to a particular time period. In some examples, the searched KPI data can be selected as described herein. In some examples, selecting particular KPI data can display other relevant KPI data and/or performance data that relates to the selected KPI data.

In some examples, the query tool can be utilized to select individual elements of the query. In these examples, the selected individual elements can be added to a query string that is generated by the query tool. In some examples, the individual elements can include, but are not limited to: all airlines, specific airlines, specific flights, specific aircraft identifiers. In some examples, the individual elements can include: all KPI data, selected KPI data, all user comments, selected user comments, whole KPI data range, selected KPI data range. In some examples, particular elements can be defined as default elements, which can be used in all future queries. In some examples, particular queries can be saved and utilized at a later time. In some examples, the query tool can reduce data retrieval lead time.

Figure 3:
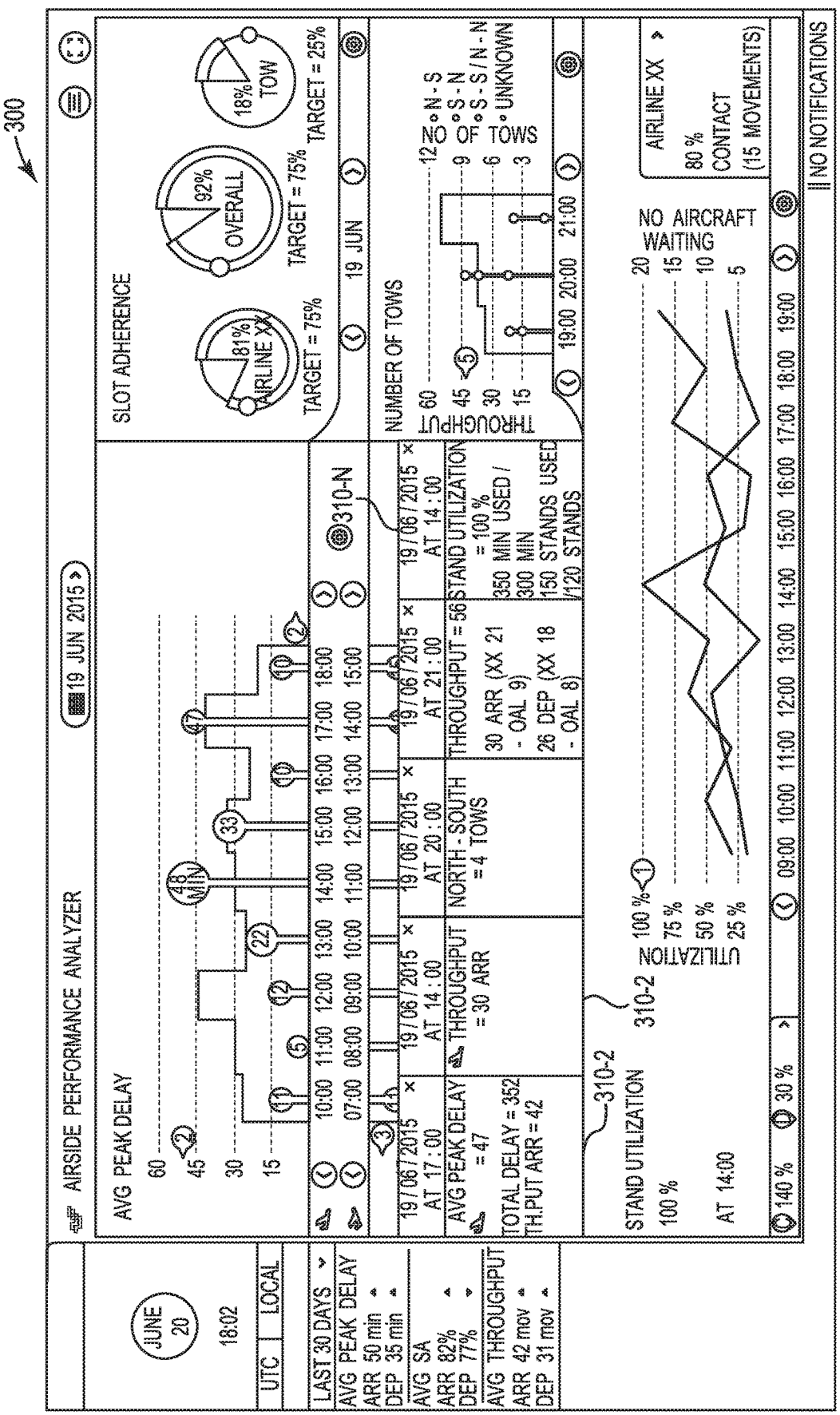
FIG. 3 is an example of a system for airside performance analysis according to one or more embodiments of the present disclosure.

FIG. 3 is an example of a system 300 for airside performance analysis according to one or more embodiments of the present disclosure. In some examples, the system 300 can include the same or similar features as system 100 as referenced in FIG. 1 or system 200 as referenced in FIG. 2. For example, the system 300 can include a number of widgets as described herein.

In some examples, the system 300 can include a number of tooltip widgets 310-1, 310-2, 310-N. The number of tooltip widgets 310-1, 310-2, 310-N can be relatively small windows compared to the number of widgets described herein (e.g., widget 104-1, 104-2, 104-3, 104-4 as referenced in FIG. 1). In some examples, the number of tooltip widgets 310-1, 310-2, 310-N can each be utilized to generate particular performance data based on the KPI data. In some examples, the number of tooltip widgets 310-1, 310-2, 310-N can be organized and/or pinned to the user interface. In some examples, multiple tooltip widgets 310-1, 310-2, 310-N can be utilized to generate the same type of performance data but for a different time period. In some examples, the tooltip widgets 310-1, 310-2, 310-N can be utilized to generate the same or similar performance metrics as the widgets described herein. For example, the tooltip widgets 310-1, 310-2, 310-N can generate performance data including: average peak delay, slot adherence, number of tows, and/or stand utilization.

Figure 4:
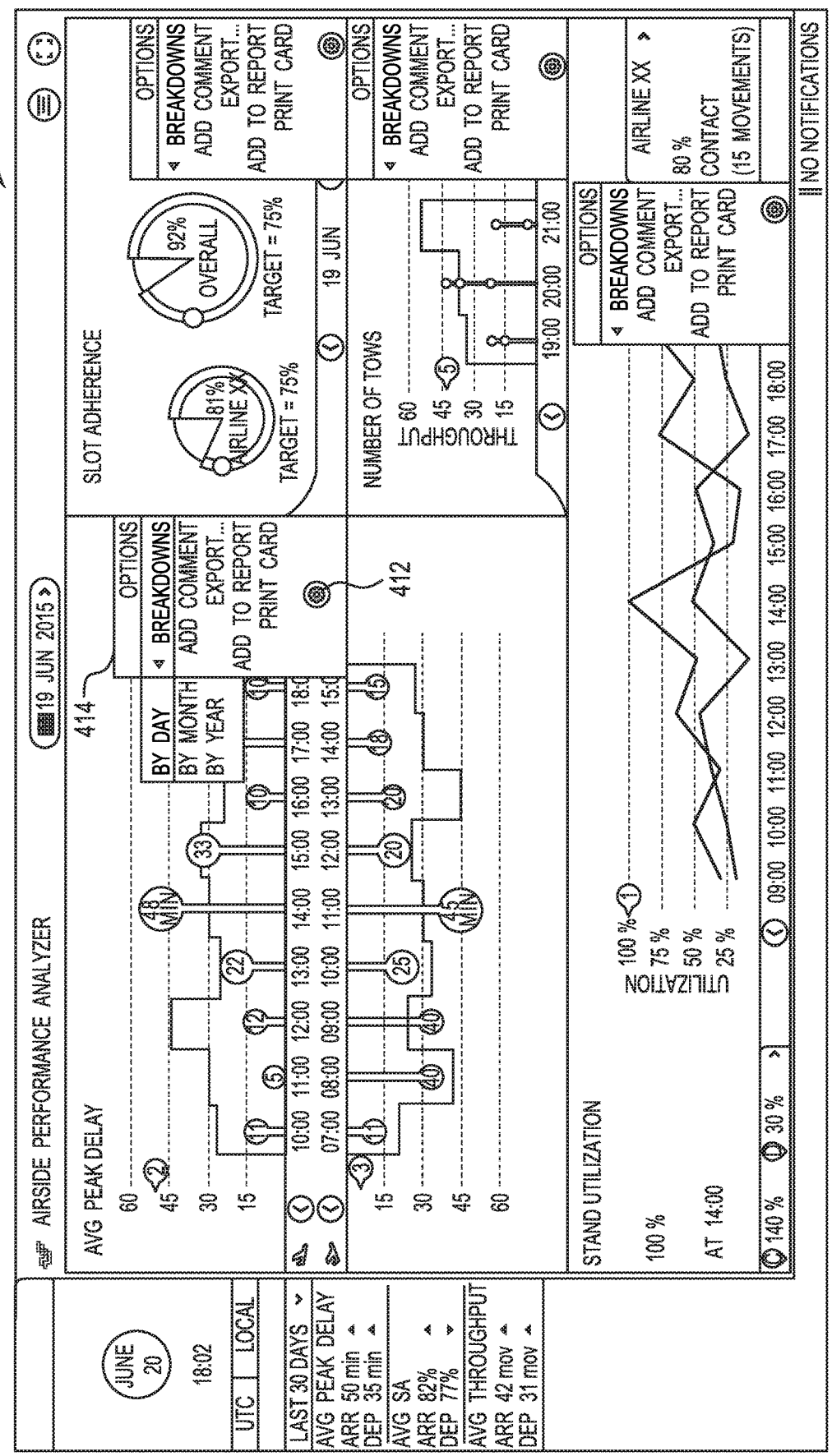
FIG. 4 is an example of a system for airside performance analysis according to one or more embodiments of the present disclosure.

FIG. 4 is an example of a system 400 for airside performance analysis according to one or more embodiments of the present disclosure. In some examples, the system 400 can include the same or similar features as system 100 as referenced in FIG. 1, system 200 as referenced in FIG. 2, or system 300 as referenced in FIG. 3. For example, the system 400 can include a number of widgets as described herein.

In some examples, the system 400 can include an options tool 414. In some examples, the options tool 414 can be selected to display a number of options for displaying additional performance data and/or KPI data. In some examples, the options tool 414 can include a breakdowns option. In some examples, the breakdowns option can be utilized to select a time period (e.g., day, month, year, etc.). In some examples, the options tool 414 can include an add comment option. In some examples, the add comment option can be selected to add text and images to a particular widget, a particular performance data point, and/or particular KPI data point. In some examples, other users of the system 400 can view comments added to each of the KPI data. For example, a first user can select a particular data point and add text and/or images to the particular data. In this example, a second user can select the particular data point and view the text and/or images inserted by the first user. In some examples, the added text and/or images can be exported with the particular KPI data point. For example, the added text and/or images can be exported with the particular KPI data associated with the particular KPI data point.

In some examples, the options tool 414 can include an export option. In some examples, the export option can be selected to export the KPI data and/or generated performance data to a different program or system. For example, the export option can be selected to export KPI data and/or generated performance data to a spreadsheet program.

In some examples, the options tool 414 can include an add to report option. In some examples, the add to report option can be utilized to add files or additional KPI data to a particular widget and/or a database utilized by the number of widgets. In some examples, the options tool 414 can include a print card option. In some examples, the print card option can be selected to print a portion of user interface. In some examples, the print card option can be utilized to print a particular widget display.

In some examples, the system 400 can include a settings tool 412. In some examples, each of the number of widgets can include a settings tool 412 to alter a number of settings for the corresponding widget. In some examples, the settings can be utilized to alter how the performance data is generated and/or utilized to alter what is displayed by the widget. In some examples, the altered settings utilizing the settings tool 412 can be saved to a corresponding user profile. For example, a user can be logged into the system 400 and settings that are altered via the settings tool 412 can be saved to the user profile of the user and applied to later sessions when the user logs into the system 400.

Figure 5:
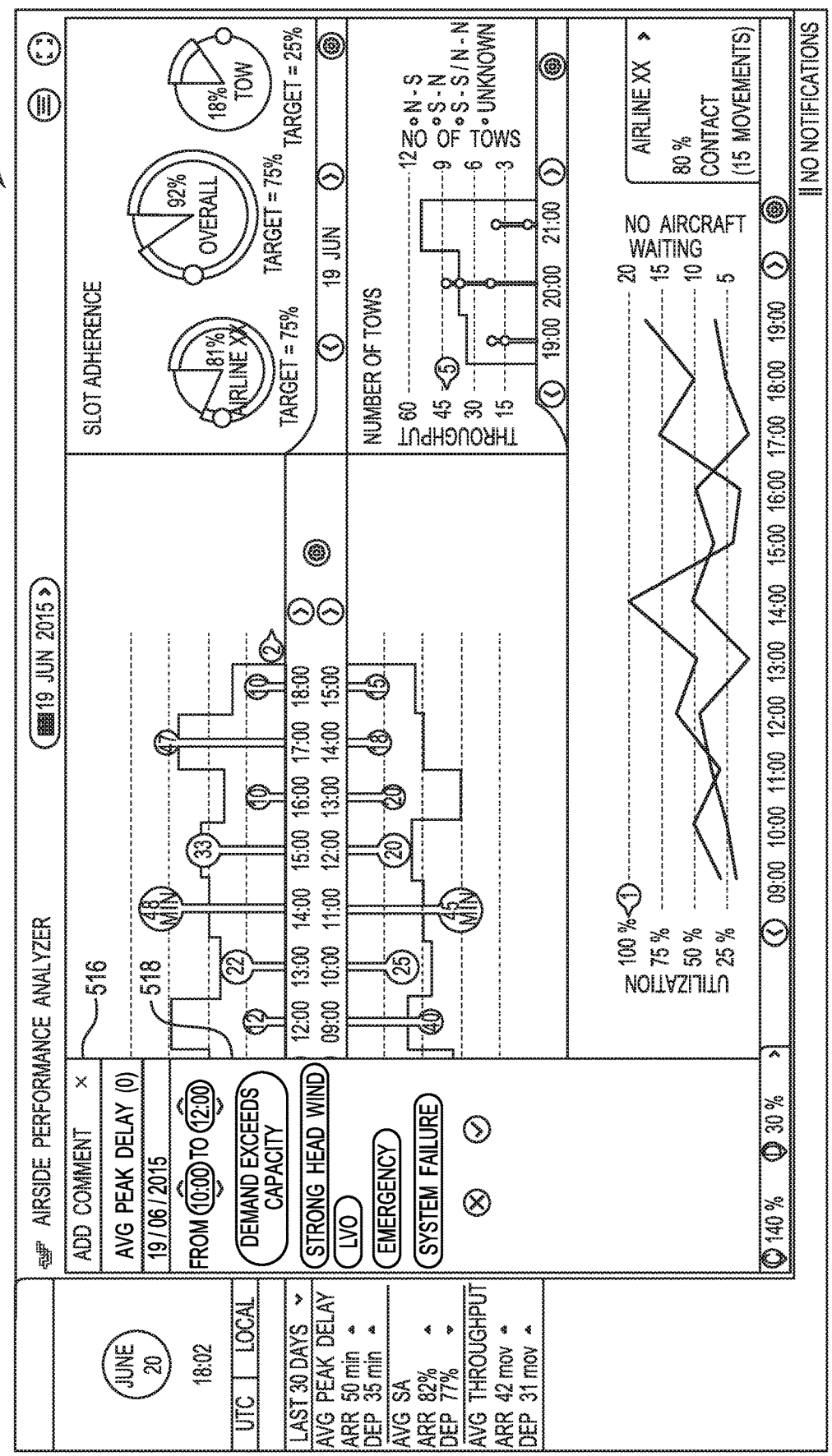
FIG. 5 is an example of a system for airside performance analysis according to one or more embodiments of the present disclosure.

FIG. 5 is an example of a system 500 for airside performance analysis according to one or more embodiments of the present disclosure. In some examples, the system 500 can include the same or similar features as system 100 as referenced in FIG. 1, system 200 as referenced in FIG. 2, system 300 as referenced in FIG. 3, or system 400 as referenced in FIG. 4. For example, the system 500 can include a number of widgets as described herein.

In some examples, the system 500 can include an add comment tool 516. In some examples, the add comment tool 516 can be displayed upon selection of an add comment option (e.g., add comment option from the options tool 414 as referenced in FIG. 4, etc.). In some examples, the add comment tool 516 can identify the widget where the comment will be added. In some examples, the add comment tool 516 can include a number of options 518.

In some examples, the number of options 518 can include a time period selection tool to identify a time period to add a corresponding comment. In some examples, the number of options 518 can include a number of predefined comments for a particular widget. For example, the predefined comments can include, but are not limited to: demand exceeds capacity, strong head wind, LVO, emergency, and/or system failure. In some examples, the predefined comments can be selected and added to the selected time period. In some examples, the predefined comments can correspond to a particular user profile. For example, a first user profile can include a first set of predefined comments and a second user profile can include a second set of predefined comments that are different than the first set of predefined comments.

FIG. 6 is an example of a computing device 690 for multi-user commissioning according to one or more embodiments of the present disclosure. Computing device 690 can be, for example, a commodity server, a data center that comprises a plurality of servers, among other types of computing devices or embedded system. Computing device 690 can be utilized in systems 100, 200, 300, 400, 500 to perform the functions previously described herein.

As shown in FIG. 6, computing device 690 includes a memory 692 and a processing resource 694 (e.g., processor) coupled to memory 692. Memory 692 can be any type of storage medium that can be accessed by processing resource 694 to perform various examples of the present disclosure. For example, memory 692 can be a non-transitory computer readable medium having computer readable instructions (e.g., computer program instructions) stored thereon that are executable by processing resource 694 to receive key performance indicator (KPI) data from a number of different system monitors, correlate the KPI data to generate a number of graphical representations of the correlated KPI data, link the number of widgets to update the corresponding report based on a received selection, and/or display a number of widgets that generate a corresponding report of the correlated KPI data.

Memory 692 can be volatile or nonvolatile memory. Memory 692 can also be removable (e.g., portable) memory, or non-removable (e.g., internal) memory. For example, memory 692 can be random access memory (RAM) (e.g., dynamic random access memory (DRAM) and/or phase change random access memory (PCRAM)), read-only memory (ROM) (e.g., electrically erasable programmable read-only memory (EEPROM) and/or compact-disc read-only memory (CD-ROM)), flash memory, a laser disc, a digital versatile disc (DVD) or other optical disk storage, and/or a magnetic medium such as magnetic cassettes, tapes, or disks, among other types of memory.

Further, although memory 692 is illustrated as being located in computing device 690, embodiments of the present disclosure are not so limited. For example, memory 692 can also be located internal to another computing resource (e.g., enabling computer readable instructions to be downloaded over the Internet or another wired or wireless connection).

As shown in FIG. 6, computing device 690 can also include a user interface 696. User interface 696 can include, for example, a display (e.g., a screen). The display can be, for instance, a touch-screen (e.g., the display can include touch-screen capabilities). User interface 696 (e.g., the display of user interface 696) can provide (e.g., display and/or present) information to a user of computing device 690.

Additionally, computing device 690 can receive information from the user of computing device 690 through an interaction with the user via user interface 696. For example, computing device 690 (e.g., the display of user interface 696) can receive input from the user via user interface 696. The user can enter the input into computing device 690 using, for instance, a mouse and/or keyboard associated with computing device 690, or by touching the display of user interface 696 in embodiments in which the display includes touch-screen capabilities (e.g., embodiments in which the display is a touch screen).

As used herein, "a" or "a number of" something can refer to one or more such things. For example, "a number of resources" can refer to one or more resources. Additionally, the designator "N", as used herein, particularly with respect to reference numerals in the drawings, indicates that a number of the particular feature so designated can be included with a number of embodiments of the present disclosure.

As described herein, a "module" can include computer readable instructions that can be executed by a processing resource to perform a particular function. A module can also include hardware, firmware, and/or logic that can perform a particular function.

As used herein, "logic" is an alternative or additional processing resource to execute the actions and/or functions, described herein, which includes hardware (e.g., various forms of transistor logic, application specific integrated circuits (ASICs)), as opposed to computer executable instructions (e.g., software, firmware) stored in memory and executable by a processing resource.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above elements and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A system for airside performance analysis, comprising:
a computing device having a user interface, wherein the computing device is configured to:
receive key performance indicator (KPI) data from a number of different airport system monitors;
correlate the KPI data to generate a number of graphical representations of the correlated KPI data based on a first user profile and job description associated with the first user profile;
link a number of widgets to a report corresponding to the correlated KPI data based on the first user profile;
add a first comment to a particular data point of the KPI data and add a second comment to the number of widgets, wherein at least one of the first comment and the second comment include text and an image and the second comment is a predefined comment selected from a number of predefined comments that correspond to, and are included in, the first user profile;
display, on the user interface, the number of widgets to include the correlated KPI data and display, on the user interface, the second comment on the number of widgets, wherein the displayed number of widgets correspond to features of the airport that pertain to the job description associated with the first user profile;
receive, via the user interface, a selection of the particular data point by a second user with a second user profile; and
display, on the user interface, the particular data point of the KPI data with the first comment when the selection of the particular data point by the second user with the second user profile is received.

2. The system of claim 1, wherein the received selection includes a time period selection.

3. The system of claim 2, wherein the received selection is a cursor over selection.

4. The system of claim 1, wherein the report includes at least one of:
an average peak delay report;
a slot adherence report;
a tow report with loss movements KPI; and
a stand utilization report with aircraft on ground.

5. The system of claim 1, wherein the computing device displays, on the user interface, support documentation of the KPI data utilized by a particular widget upon a selection of the particular widget.

6. The system of claim 1, wherein the number of widgets are selected widgets from a plurality of widgets.

7. The system of claim 6, wherein the selected widgets are pinned to the user interface of the computing device and displayed on the user interface for a user associated with a particular user profile.

8. The system of claim 1, wherein the number of widgets are linked by a time period.

9. The system of claim 1, wherein each of the number of widgets utilizes a corresponding portion of the KPI data.

10. The system of claim 1, wherein at least one of the number of widgets utilizes a scrolling text to:
display real time KPI data;
display the KPI data based on a received selection;
display operational data; and
display the KPI data based on a time period selection.

11. A non-transitory computer readable medium, comprising instructions executable by a processing resource to:
receive key performance indicator (KPI) data from a number of different airport system monitors;
correlate the KPI data to generate a number of graphical representations of the correlated KPI data based on a first user profile and job description associated with the first user profile;
determine a portion of widgets from a plurality of widgets that correspond to the first user profile;
link the determined portion of widgets to a report corresponding to the correlated KPI data based on the first user profile;
add a first comment to a particular data point of the KPI data and add a second comment to the portion of widgets, wherein the second comment is a predefined comment selected from a number of predefined comments that correspond to, and are included in, the first user profile;
display, on a user interface, the portion of widgets to include the correlated KPI data and display, on the user interface, the second comment on the portion of widgets, wherein the displayed portion of widgets correspond to features of the airport that pertain to the job description associated with the first user profile;
receive, via the user interface, a selection of the particular data point by a second user with a second user profile; and
display, on the user interface, the particular data point of the KPI data with the first comment when the selection of the particular data point by the second user with the second user profile is received.

12. The medium of claim 11, wherein each of the plurality of widgets provide a different level of detail for corresponding correlated KPI data.

13. The medium of claim 12, wherein the level of detail provided by the portion of the plurality of widgets is based on the first user profile.

14. The medium of claim 11, wherein the first user profile includes a job description that defines relevant data for the first user.

15. The medium of claim 11, comprising instructions to update the portion of the plurality of widgets to reflect KPI data corresponding to a time period.

16. The medium of claim 11, wherein the portion of the plurality of widgets are determined based on KPI data and the job description associated with the first user profile.

17. A method for airside performance analysis, comprising:
determining a first user profile associated with an active user;
receiving key performance indicator (KPI) data from a number of different airport system monitors based on the determined user profile;
correlating the KPI data to generate a number of graphical representations of the correlated KPI data based on the first user profile and job description associated with the first user profile;
determining a portion of widgets from a plurality of widgets that correspond to the first user profile;

determining a time period and a level of detail for the portion of widgets based on the first user profile;

linking the determined portion of widgets to a report corresponding to the correlated KPI data based on the first user profile;

adding a first comment to a particular data point of the KPI data and add a second comment to the portion of widgets, wherein:

at least one of the first comment and the second comment include text and an image; and the second comment is a predefined comment selected from a number of predefined comments that correspond to, and are included in, the first user profile;

displaying, on a user interface, the portion of widgets to include the correlated KPI data for the determined time period and at the determined level of detail, and display, on the user interface, the second comment on the portion of widgets, wherein the displayed portion of widgets correspond to features of the airport that pertain to the job description associated with the first user profile;

receiving, via the user interface, a selection of the particular data point by a second user with a second user profile; and displaying, on the user interface, the particular data point of the KPI data with the first comment when the selection of the particular data point by the second user with the second user profile is received.

18. The method of claim 17, comprising displaying, on the user interface, scrolling text of real time KPI data based on the first user profile.

19. The method of claim 17, comprising providing a plurality of cursor over selections for the portion of widgets.

20. The method of claim 17, comprising displaying, on the user interface, a plurality of tooltip widgets that each utilize a corresponding time period and displaying, on the user interface, correlated KPI data for the corresponding time period.

\* \* \* \* \*